(12) United States Patent
Yoo et al.

(10) Patent No.: US 12,309,312 B2
(45) Date of Patent: May 20, 2025

(54) ELECTRONIC DEVICE AND METHOD FOR CONTROLLING SECURITY OF CAMERA

(71) Applicant: Samsung Electronics Co., Ltd., Suwon-si (KR)

(72) Inventors: Juwoan Yoo, Suwon-si (KR); Dasom Lee, Suwon-si (KR); Wonsuk Jang, Suwon-si (KR); Taehwa Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 17/964,511

(22) Filed: Oct. 12, 2022

(65) Prior Publication Data

US 2023/0156118 A1 May 18, 2023

Related U.S. Application Data

(63) Continuation of application No. PCT/KR2022/014682, filed on Sep. 29, 2022.

(30) Foreign Application Priority Data

Nov. 16, 2021 (KR) ........................ 10-2021-0157462

(51) Int. Cl.
*H04W 64/00* (2009.01)
*G06F 21/31* (2013.01)
*G06F 21/44* (2013.01)
*H04M 1/72463* (2021.01)

(52) U.S. Cl.
CPC ...... *H04M 1/724631* (2022.02); *G06F 21/31* (2013.01); *G06F 21/44* (2013.01)

(58) Field of Classification Search
None
See application file for complete search history.

(56) References Cited

U.S. PATENT DOCUMENTS

2012/0009896 A1  1/2012  Bandyopadhyay et al.
2014/0013422 A1*  1/2014  Janus ...................... G06F 21/32
                                                              726/19

(Continued)

FOREIGN PATENT DOCUMENTS

CN    10-6529270 A    3/2017
CN    106603772 A     4/2017

(Continued)

OTHER PUBLICATIONS

International Search Report dated Jan. 12, 2023, issued in International Application No. PCT/KR2022/014682.

*Primary Examiner* — Frantz Bataille
(74) *Attorney, Agent, or Firm* — Jefferson IP Law, LLP

(57) ABSTRACT

A method and a device are provided. The device includes a display, a camera module disposed below the display, a memory, and a processor operatively connected to at least one of the display, the camera module, or the memory, wherein the processor is configured to receive a camera security configuration change, identify an application being executed, determine whether the identified application corresponds to a configured condition, and based on a result of the determination, control display of a camera security pattern on a display area of the display corresponding to the camera module.

20 Claims, 15 Drawing Sheets

(56) References Cited

U.S. PATENT DOCUMENTS

| | | | |
|---|---|---|---|
| 2015/0302421 A1* | 10/2015 | Caton | ............. G06K 19/06037 705/17 |
| 2018/0210493 A1 | 7/2018 | Bao | |
| 2019/0332764 A1 | 10/2019 | Jeon et al. | |
| 2020/0137314 A1 | 4/2020 | Miao | |
| 2021/0390171 A1 | 12/2021 | Yuan et al. | |

FOREIGN PATENT DOCUMENTS

| CN | 110730298 A | 1/2020 |
|---|---|---|
| EP | 4080322 A1 | 10/2022 |
| JP | 2007-011903 A | 1/2007 |
| KR | 10-2005-0013003 A | 2/2005 |
| KR | 10-2018-0079950 A | 7/2018 |
| KR | 10-2018-0088511 A | 8/2018 |
| KR | 10-2021-0076095 A | 6/2021 |
| KR | 10-2021-0101678 A | 8/2021 |

* cited by examiner

[610]  [630]  [650]

ELECTRONIC DEVICE AND METHOD FOR CONTROLLING SECURITY OF CAMERA

CROSS-REFERENCE TO RELATED APPLICATION(S)

This application is a continuation application, claiming priority under § 365(c), of an International application No. PCT/KR2022/014682, filed on Sep. 29, 2022, which is based on and claims the benefit of a Korean patent application number 10-2021-0157462, filed on Nov. 16, 2021, in the Korean Intellectual Property Office, the disclosure of which is incorporated by reference herein in its entirety.

TECHNICAL FIELD

The disclosure relates to a method and an electronic device for controlling camera security.

BACKGROUND ART

With the development of digital technology, various types of electronic devices such as a mobile communication terminal, a personal digital assistant (PDA), an electronic notebook, a smart phone, a tablet personal computer (PC), or a wearable device are widely used. In order to support and increase functions of the electronic device, hardware part and/or software part of the electronic device are continuously being improved.

The electronic device includes a camera having a structure in which an image sensor is visually exposed to the outside so as to easily receive an external reflected light source. In the electronic device, a camera is installed in a hole formed through a part of a display, and thus the image sensor cannot be physically covered.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An application having been installed in an electronic device is accessible to a camera of the electronic device, and may perform photographing through an application programming interface (API) open to the public. For example, when an authority to use a camera is obtained from a user, the application may drive the camera to perform photographing in a situation in which a user is unrecognizable. Since the existing camera is always open through a hole in the display, a user may be unable to visually identify whether the camera is operating. Therefore, when photographing is attempted without displaying a preview image in the application, a user may be unable to recognize that the camera is performing photographing.

Aspects of the disclosure are to address at least the above-mentioned problems and/or disadvantages and to provide at least the advantages described below. Accordingly, an aspect of the disclosure is to provide a method and an apparatus for applying camera security so as to make camera photographing selectively possible only when an authorized application is used or when a user grants permission.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a display, a camera module disposed below the display, a memory, and a processor operatively connected to at least one of the display, the camera module, or the memory, wherein the processor is configured to receive a camera security configuration change, identify an application being executed, determine whether the identified application corresponds to a configured condition, and based on a result of the determination, control to display a camera security pattern on a display area of the display corresponding to the camera module.

In accordance with another aspect of the disclosure, a method for operating an electronic device is provided. The method includes receiving a camera security configuration change from a user or an application, identifying an application being executed, determining whether the identified application corresponds to a configured condition, and controlling, based on a result of the determination, to display a camera security pattern on a display area of the display corresponding to the camera module.

Advantageous Effects of Invention

According to various embodiments, camera photographing is selectively possible only when an authorized application is used or when a user grants permission, and thus camera security can be enhanced.

According to various embodiments, when camera photographing is not allowed, a camera security pattern for showing that camera security is being applied can be displayed at a location corresponding to a camera to thereby indicate that an electronic device or the camera of the electronic device is being safely protected.

According to various embodiments, a camera security pattern can be displayed at a location corresponding to a camera, so as to visually notify a user that camera photographing is not allowed.

According to various embodiments, by displaying a camera security pattern at a location corresponding to a camera, even if camera photographing has been performed, a photographed image may be invalidated because the photographed image is difficult to be identified due to the camera security pattern.

According to various embodiments, applications can be managed in a server and normal camera photographing with regard to an unsafe application is impossible in principle, and thus it is possible to prevent an attempt to acquire a normal image in advance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
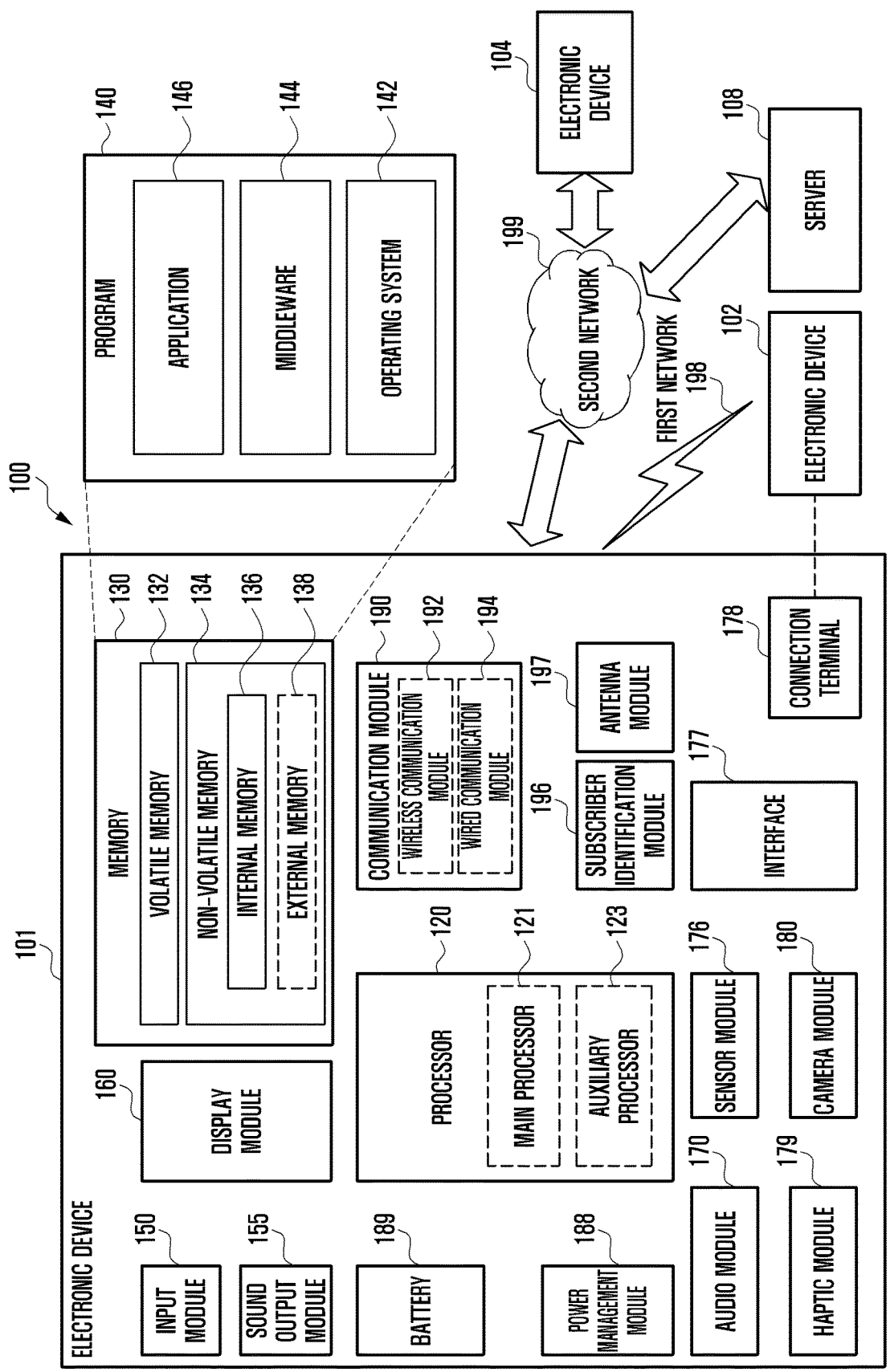
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
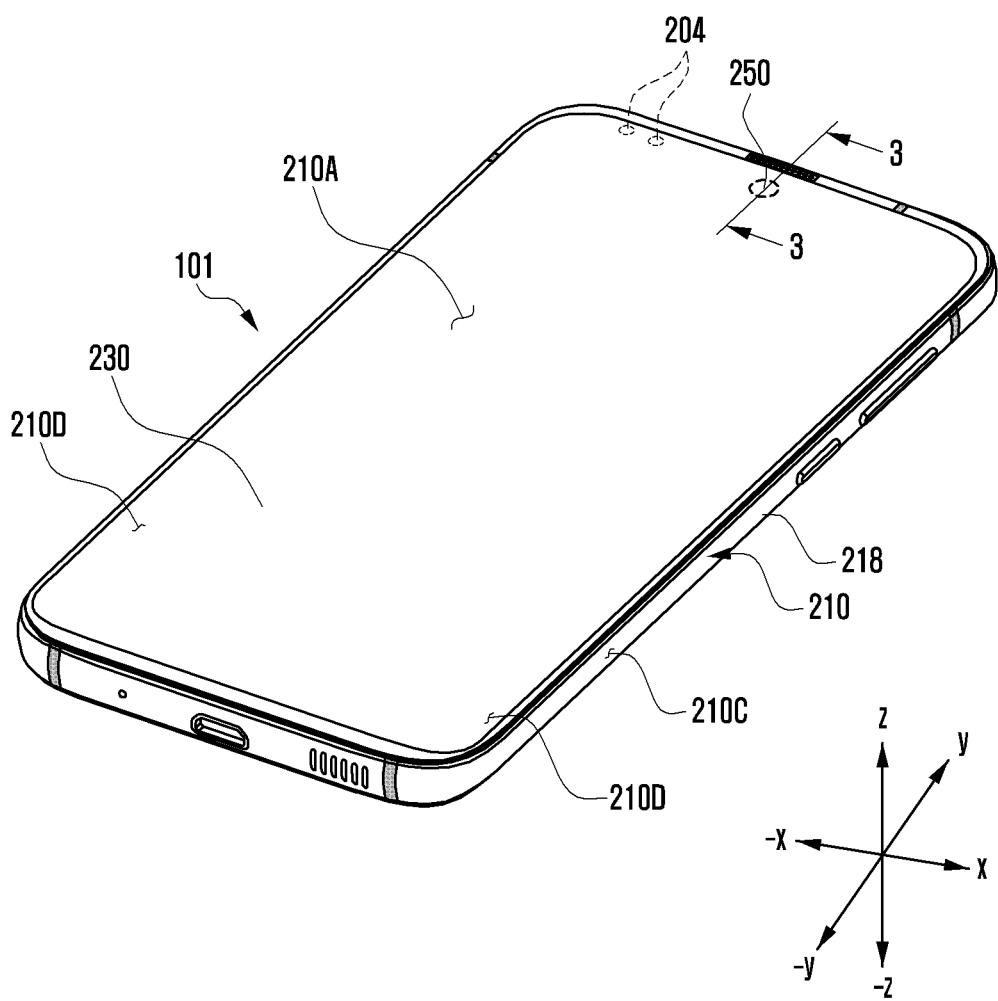
FIGS. 2A and 2B are perspective views of an electronic device according to various embodiments of the disclosure.
Figure 2B:
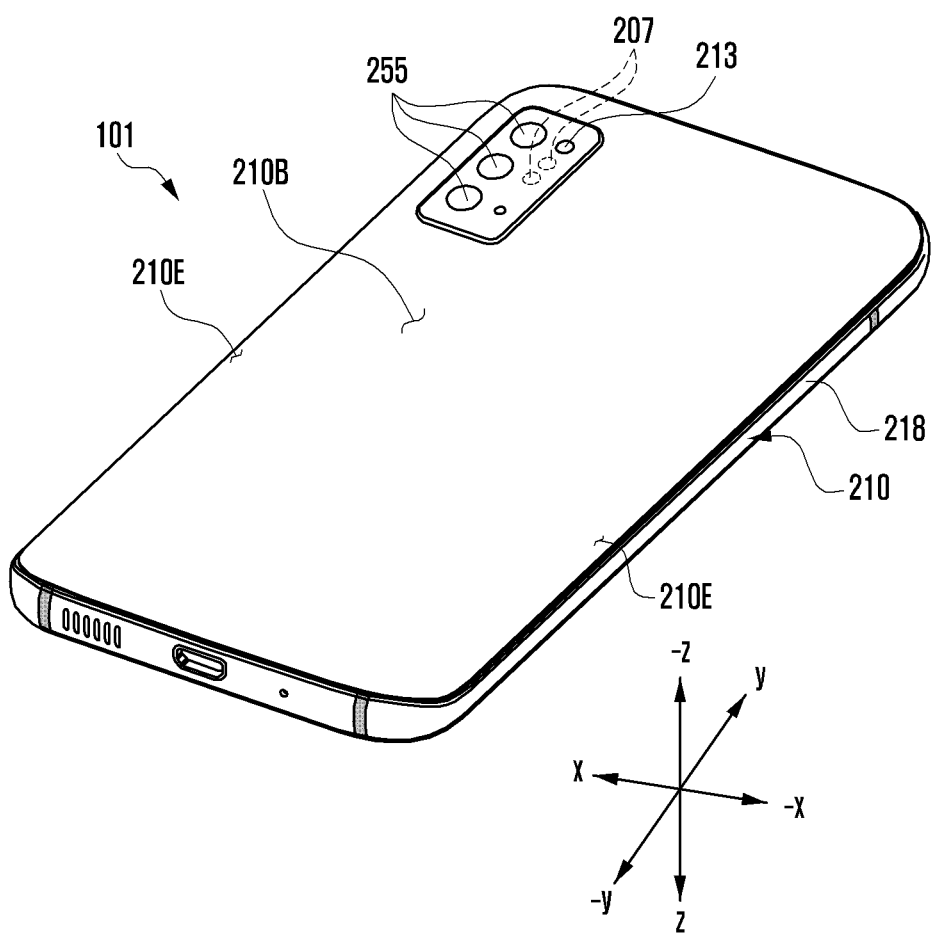

FIGS. 2A and 2B are perspective views of an electronic device according to various embodiments of the disclosure. FIG. 2A is a perspective view of the front surface of the electronic device 101 in FIG. 1 according to an embodiment of the disclosure, and FIG. 2B is a perspective view of the rear surface of the electronic device 101 in FIG. 1 according to an embodiment of the disclosure.

Referring to FIGS. 2A and 2B, an electronic device (e.g., the electronic device 101 in FIG. 1) according to various embodiments may include a housing 210 which includes a first surface (or a front surface) 210A, a second surface (or a rear surface) 210B, and a side surface 210C surrounding the space between the first surface 210A and the second surface 210B. According to another embodiment, the housing 210 may be a structure forming some of the first surface 210A, the second surface 210B, and the side surface 210C.

According to an embodiment, the first surface 210A may be formed of a front plate, at least a part of which is substantially transparent (e.g., a polymer plate, or a glass plate including various coated layers). The second surface 210B may be formed of a substantially opaque rear plate. The rear plate may be formed of, for example, coated or colored glass, ceramic, polymer, metal (e.g., aluminum, stainless steel (STS), or magnesium), or a combination of at least two of the materials. The side surface 210C may be coupled to the front plate and the rear plate, and may be formed of a side bezel structure 218 (or "a side member") containing metal and/or polymer. In an embodiment, the rear plate and the side bezel structure 218 may be integrally formed, and may contain an identical material (e.g., a metal material such as aluminum).

According to various embodiments, the front plate may include a first area 210D, curved and seamlessly extending from the first surface 210A toward the rear plate, at both ends of a long edge of the front plate. Alternatively, the rear plate may include a second area 210E, curved and seamlessly extending from the second surface 210B toward the front plate, at both ends of a long edge thereof. In an embodiment, the front plate or the rear plate may include only one of the first area 210D or the second area 210E.

In an embodiment, the front plate may include only a flat surface disposed parallel to the second surface 210B without including the first area and the second area. When the electronic device 101 is seen from the side, the side bezel structure 218 may have a first thickness (or width) at the side surface which does not include the first area 210D or the second area 210E, described above, and may have a second thickness less than the first thickness at the side surface which includes the first area 210D or the second area 210E.

A display 230 (e.g., the display module 160 in FIG. 1) may be exposed through a considerable part of the front plate. In an embodiment, at least a part of the display 230 may be exposed through the front plate which forms the first surface 210A and the first area 210D of the side surface 210C. The display 230 may be coupled to or disposed adjacent to a touch sensing circuit, a pressure sensor capable of measuring the strength (pressure) of a touch, and/or a digitizer for detecting a magnetic field-type stylus pen. In an embodiment, at least some of sensor modules 204 and 207 (e.g., the sensor module 176 in FIG. 1) and/or at least some of input modules (e.g., the input module 150 in FIG. 1) may be disposed in the first area 210D and/or the second area 210E.

The sensor modules 204 and 207 may generate electrical signals or data values corresponding to an operation state inside the electronic device 101 or an environment state outside the electronic device 101. The sensor modules 204 and 207 may include, for example, a first sensor module (e.g., a proximity sensor) and/or a second sensor module (e.g., a fingerprint sensor), disposed in the first surface 210A of the housing 210, and/or a third sensor module (e.g., an HRM sensor) disposed in the second surface 210B of the housing 210. The fingerprint sensor may be disposed in a partial area of the first surface 210A (e.g., a home key button) of the housing 210 or a partial area of the second surface 210B, and/or under the display 230.

Camera modules 250 and 255 (e.g., the camera module 180 in FIG. 1) may include a first camera module 250 disposed in the first surface 210A of the electronic device 101, a second camera module 255 disposed in the second surface 210B, and/or a flash 213. The camera modules 250 and 255 may include one lens or multiple lenses, an image sensor, and/or an image signal processor. The flash 213 may include a light-emitting diode or a xenon lamp. In an embodiment, at least two lenses (a wide-angle lens, an ultra-wide-angle lens, or a telephoto lens) and image sensors may be disposed in one surface of the electronic device 101.

The first camera module 250 among the camera modules 250 and 255, some sensor modules 204 among the sensor modules 204 and 207, or an indicator may be disposed to be exposed through the display 230. For example, the first camera module 250, the sensor module 204, or the indicator may be disposed in the inner space of the electronic device 101 so as to be brought into contact with an external environment through an opening of the display 230, bored up to the front plate, or a transmissive area thereof. According to an embodiment, an area in which the display 230 faces the first camera module 250 is an area in which contents are displayed, and may be formed as a transmissive area having predetermined transmissivity.

According to an embodiment, the transmissive area may be formed to have transmissivity ranging from about 5% to about 20%. This transmissive area may include an area overlapping an effective area (e.g., a field-of-view area) of the first camera module 250, through which light that is imaged by an image sensor to producing an image passes. For example, the transmissive area of the display 230 may include an area having a pixel density lower than that therearound.

For example, the transmissive area may replace the opening. For example, the first camera module 250 may include an under-display camera (UDC). In another embodiment, some sensor modules 204 may be disposed so as to perform functions thereof without being visually exposed through the front plate in the inner space of the electronic device. For example, in this case, an area of the display 230, which faces the sensor module, may not require a bored opening.

According to various embodiments, the electronic device 101 has a bar-type or plate-type exterior, but the disclosure is not limited thereto. For example, the electronic device 101 may be a part of a foldable electronic device, a slidable electronic device, a stretchable electronic device, and/or a rollable electronic device. The "foldable electronic device", the "slidable electronic device", the "stretchable electronic device", and/or the "rollable electronic device" may imply an electronic device wherein, because the bending deformation of the display 230 is possible, at least a part of the electronic device can be folded or wound (or rolled), or the area of the electronic device can be at least partially enlarged and/or received into the housing 210. In the foldable electronic device, the slidable electronic device, the stretchable electronic device, and/or a rollable electronic device, a screen display area may be extended and used by unfolding a display or exposing the wider area of the display according to a user's need.

Figure 3:
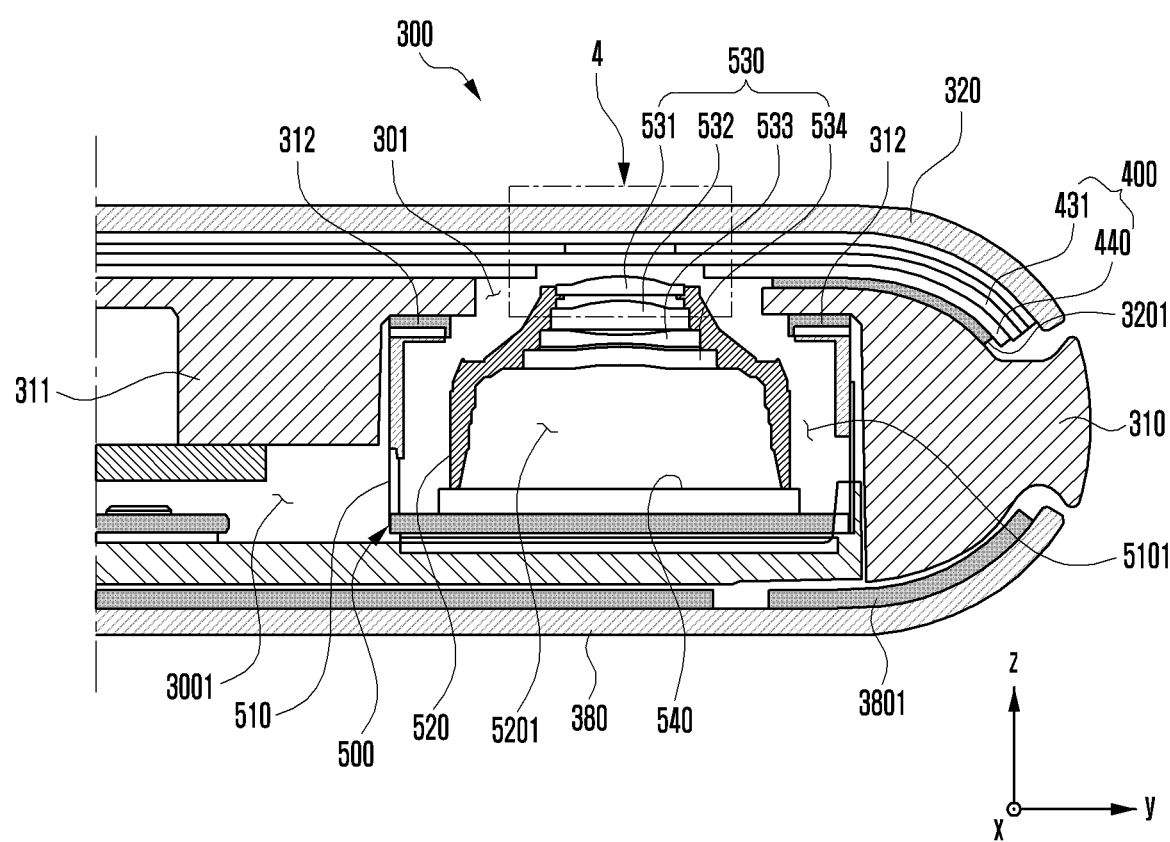
FIG. 3 is a partial cross-sectional view of an electronic device according to an embodiment of the disclosure.

FIG. 3 is a partial cross-sectional view of an electronic device, taken along line 5-5 in FIG. 2A according to an embodiment of the disclosure.

In describing FIG. 3, the description is made while providing an unbreakable (UB) type OLED display (e.g., curved display) as an example, but is not limited thereto. For example, the description may also be applied to a flat type display of on-cell touch Active Matrix Organic Light-Emitting Diode (AMOLED) (OCTA) scheme.

Referring to FIG. 3, an electronic device 300 may include a front cover 320 (e.g., a cover member, a front plate, a front window, or a first plate) facing a first direction (the z-axis direction), a rear cover 380 (e.g., a rear cover member, a rear plate, a rear window, or a second plate) facing a direction opposite to the direction faced by the front cover 320, and a side member 310 surrounding a space 3001 between the front cover 320 and the rear cover 380. According to an embodiment, the electronic device 300 may include a first waterproof member 3201 disposed between a subsidiary material layer 440 of a display 400 and the side member 310. According to an embodiment, the electronic device 300 may include a second waterproof member 3801 disposed between the side member 310 and the rear cover 380. The first waterproof member 3201 and the second waterproof member 3801 may prevent outside foreign matter or water from flowing into the inner space 3001 of the electronic device 300. In another embodiment, a waterproof member may be disposed in at least a part of a mounting support structure between a camera module 500 and the side member 310. In another embodiment, the first waterproof member 3201 and/or the second waterproof member 3801 may be replaced with an adhesive member.

According to various embodiments, the side member 310 may further include a first support member 311 which at least partially extends into the inner space 3001 of the electronic device 300. According to an embodiment, the first support member 311 may be formed by a structural coupling with the side member 310. According to an embodiment, the first support member 311 may support the camera module 500 such that the camera module 500 is aligned and disposed near the rear surface of a display panel 431 through an opening (e.g., an opening (OP) in FIG. 4) of the subsidiary material layer 440 of the display 400.

According to various embodiments, the camera module 500 may include a camera housing 510, a lens housing 520 disposed in an inner space 5101 of the camera housing 510 and at least partially protruding in a display direction (e.g., the z-axis direction), multiple lenses 530 (531, 532, 533, and 534) aligned at regular intervals in an inner space 5201 of the lens housing 520, and at least one image sensor 540 disposed in the inner space 5101 of the camera housing 510 so as to acquire at least a part of light having passed through the multiple lenses 530. According to an embodiment, when the camera module 500 includes an auto focus (AF) function), the lens housing 520 may move through a predetermined driver in the camera housing 510 such that the distance to the display panel 431 varies.

According to an embodiment, a separate driver may be disposed such that the camera module 500 changes the position of at least one of the multiple lenses 530 in order to perform the AF function. In another embodiment, in the camera module 500, the camera housing 510 may be omitted, and the lens housing 520 may be directly disposed at the first support member 311 through a predetermined alignment process. According to an embodiment, when the lens housing 520 is directly disposed at the first support member 311, in order to reduce a camera arrangement space, the camera housing 510 may be omitted and the lens housing 520 may be disposed to be attached to one side surface of the first support member 311. According to an embodiment, the camera module 500 may be aligned through a through-hole 301 of the first support member 311, and then may be attached to the rear surface of the first support member 311 by an adhesive member 312 (e.g., a bonding member or a tape member).

Figure 4:
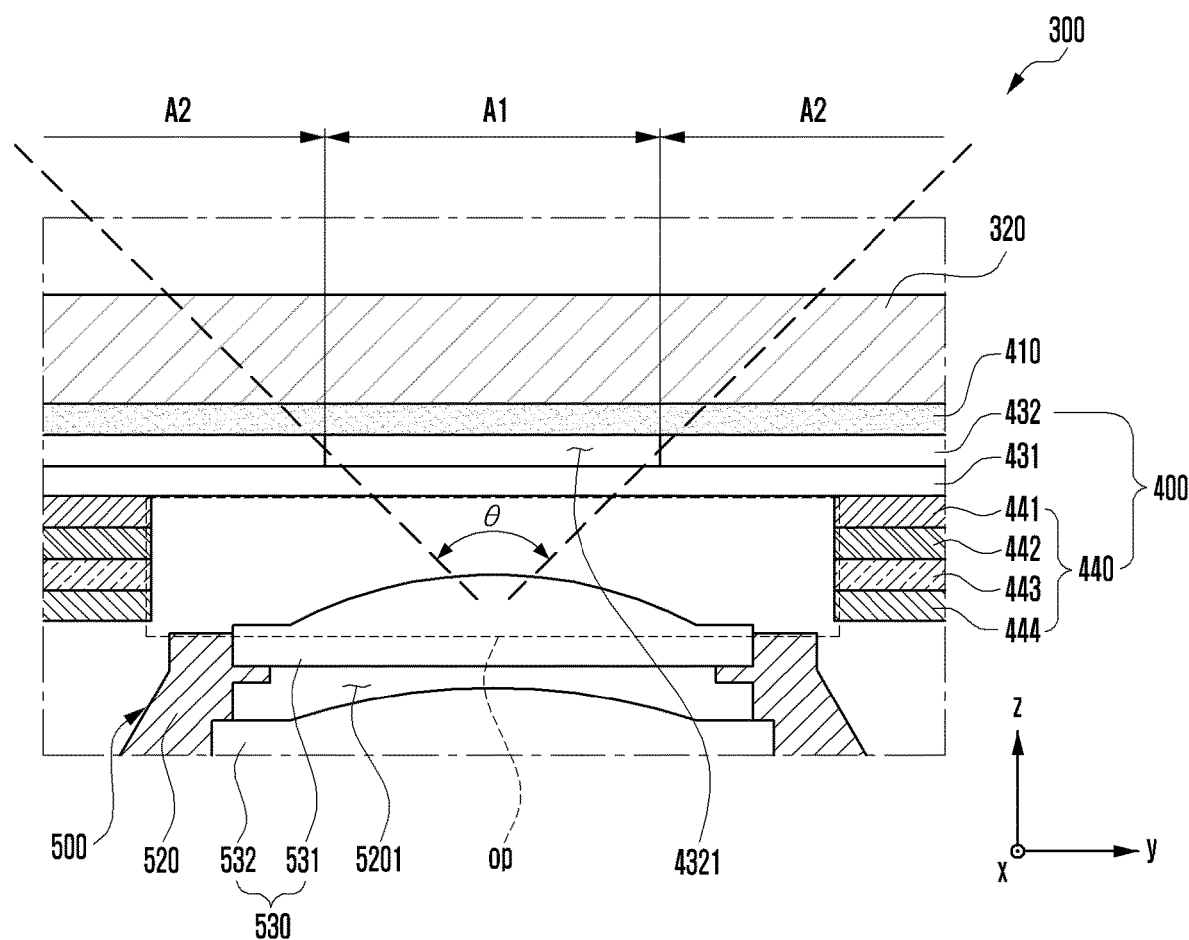
FIG. 4 is an enlarged cross-sectional view obtained by enlarging an area including a camera module of an electronic device according to an embodiment of the disclosure.

FIG. 4 is an enlarged cross-sectional view of an area including a camera module of an electronic device according to an embodiment of the disclosure. For example, FIG. 4 is an enlarged view of an area 6 including the camera module in FIG. 3.

Referring to FIG. 4, the electronic device 300 may include an adhesive layer 410, a polarizer (POL) 432, the display panel 431, and the subsidiary material layer 440, which are disposed between the rear surface of the front cover 320 and the side member 310. According to an embodiment, when the front cover 320 is seen from above, the POL 432 may include an opening 4321 formed in order to improve optical transmissivity of the camera module 500. In another embodiment, in the adhesive member (or the adhesive layer) 410 disposed on the POL 432, a part corresponding to the opening 4321 may be at least partially omitted. In an embodiment, the opening 4321 formed in the POL 432 may be filled with an index material for adjusting the refractive index according to an increase in interface reflection.

According to an embodiment, an area of the POL 432 corresponding to the multiple lenses 530 may be formed to have high transmissivity without having the opening 4321 formed therethrough. For example, at least a partial area of the POL 432 (e.g., an area corresponding to the multiple lenses 530) may be formed of a material having transmissivity different from that of the remaining area of the POL 432, or may be formed of another member capable of increasing transmissivity. According to an embodiment, a member (not shown) for increasing transmissivity may be disposed on at least a part (e.g., an upper side surface or a lower side surface) of the area of the POL 432 corresponding to the multiple lenses 530. According to an embodiment, when the front cover 320 is seen from above (e.g., in the +z-axis direction), the subsidiary material layer 440 may include an opening (OP) formed in an area at least partially overlapping the multiple lenses 530. According to an embodiment, the opening (OP) formed in the subsidiary material layer 440 may be formed as one opening (OP) by overlapping an opening formed in a light-blocking layer 441, an opening formed in a cushion layer 442, an opening formed in a functional member 443, and an opening formed in a conductive member 444. According to an embodiment, the openings may have different sizes in response to the shape of the camera module 500.

According to various embodiments, when the display 400 is seen from above (e.g., the +z-axis direction), the display panel 431 may include a first area A1, which overlaps the field of view (θ) of the camera module 500, and a second area A2 surrounding the first area A1. According to an embodiment, the first area A1 may be formed to have light transmissivity required by the camera module 500 through adjustment of a pixel density and/or a wiring density. According to an embodiment, the second area A2 may include a normal active area of the display panel 431. According to an embodiment, the second area A2 may be an area in which light transmissivity for the camera module 500 has not been taken into account. According to an embodiment, the display panel 431 may include first multiple pixels, arranged to have a first arrangement density in the first area A1, and second multiple pixels having a second arrangement density higher than the first arrangement density in the second area A2. In an embodiment, the wiring density of the first area A1 may be formed to be lower than the wiring density of the second area A2, thereby contributing to transmissivity improvement.

According to various embodiments, the first area A1 of the display panel 431 has a lower pixel density than the second area A2 therearound, and thus a light-transmitting area, which does not emit light, between a pixel and a pixel may be recognized as black and may be viewed from the outside. The display panel 431 according to various embodiments of the disclosure may include a light extractor for guiding at least a part of light generated through pixels so as to be totally reflected to an optical waveguide layer and emitted to the outside through the light-transmitting area, and thus the above problems may be solved.

Figure 5:
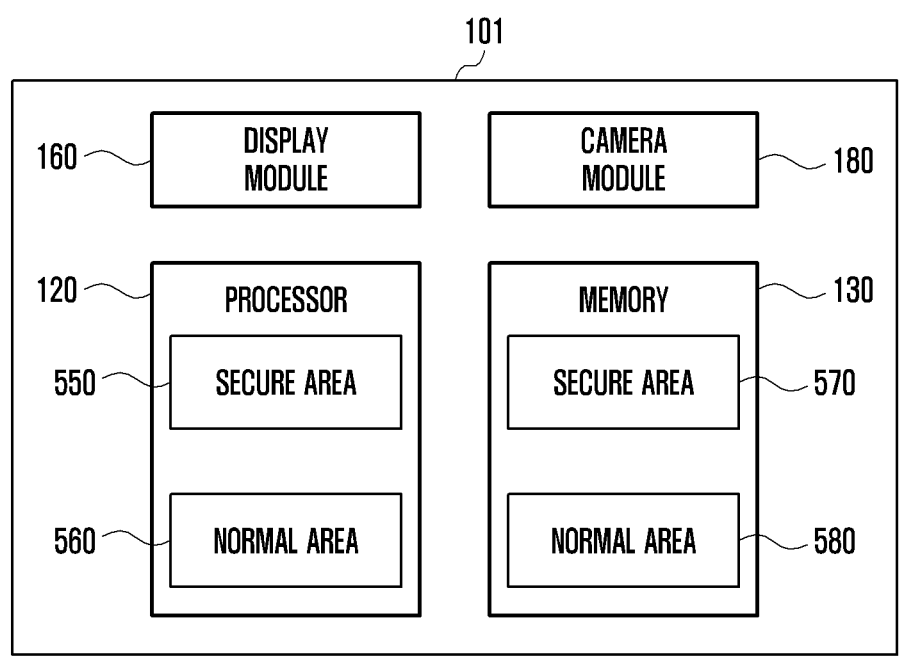
FIG. 5 illustrates a block diagram of an electronic device divided into a normal area and a secure area according to an embodiment of the disclosure.

FIG. 5 illustrates a block diagram of an electronic device divided into a normal area and a secure area according to an embodiment of the disclosure.

Referring to FIG. 5, an electronic device (e.g., the electronic device 101 of FIG. 1) according to various embodiments may include a processor (e.g., the processor 120 of FIG. 1), a memory (e.g., the memory 130 of FIG. 1), a display module (e.g., the display module 160 of FIG. 1), and a camera module (e.g., the camera module 180 of FIG. 1).

The processor 120 may be configured to be divided into a secure area (trusted zone) 550 and a normal area 560. The secure area 550 is an area having high security (or reliability) and may refer to a trusted execution environment (TEE). The normal area (normal zone) 560 is an area having lower security than the secure area 550, and may refer to a rich execution environment (REE). The secure area 550 may correspond to a separately hidden space. The secure area 550 may be a space physically or logically separated from the normal area 560.

Although, in the drawing, one processor and one memory, each of which is divided into a secure area 550 and a normal area 560, are shown in terms of hardware, the processor and the memory may be variously divided according to implementation. For example, although a processor for operating the secure area 550 is implemented together with a processor for operating the normal area 560 in the on-chip format, the processors may be implemented in a separate processing core set. Alternatively, the processor for operating the secure area 550 may be implemented in a separate chip in terms of hardware, and may be separated from a chip in which the processor for operating the normal area 560 is implemented. This is only a matter of implementation, and does not limit the disclosure.

The processor 120 may be configured to separate the secure area 550 and the normal area 560 from each other, and may store or manage, in the secure area 550, biometric information (e.g., fingerprint, iris), payment information (e.g., card number, expiration date), or information requiring high security, such as a company secure document. The processor 120 may regulate information exchange with the normal area 560 with regard to information managed by the secure area 550, and may control security software to be safely executed. The security software is software that can be driven in the secure area 550, and may include, for example, a fingerprint recognition application. The secure area 550 may be connected to a fingerprint sensor through a secure path.

According to various embodiments, the processor 120 may be configured to receive a camera security configuration change, identify an application executed at a time point at which the camera security configuration change has been received, determine whether the identified application corresponds to a configured condition, and control display of a camera security pattern based on a result of the determination. The camera security pattern may be configured by at least one of text, an image (e.g., an icon), or a video. The camera security configuration may include displaying a camera security pattern in response to the camera module 180 (e.g., ON, 'active'), or not displaying a camera security pattern in response to the camera module 180 (e.g., OFF, 'inactive'). The processor 120 may display the camera security pattern, having been stored in the secure area 570 of the memory 130, on the display module 160 corresponding to the camera module 180. Alternatively, a display driver IC (DDI) may display the camera security pattern, having been stored in the secure area 570 of the memory 130, on the display module 160 corresponding to the camera module 180.

The camera security configuration change may be requested by a user or an application. The configured condition may correspond to a case in which an application corresponds to a first type of application or user authentication is successfully completed. The application may be included in one of the first type, a second type, and a third type of application. The first type of application may be an authorized application, the second type of application may be an unauthorized application, and the third type of application may be an application that does not correspond to the first type and the second type. When the identified application corresponds to the first type of application, the processor 120 may be configured to change the camera security configuration. When the identified application corresponds to the second type of application, the processor 120 may be configured not to change the camera security configuration. When the identified application corresponds to the third type of application, the processor 120 may be configured to request user authentication, and when the user authentication is successfully completed, the processor 120 may be configured to change the camera security configuration. When the user authentication fails, the processor 120 may be configured not to change the camera security configuration.

While the camera security configuration is in a state of being 'active', when the camera security configuration is requested to be changed to 'inactive', in case that the identified application corresponds to the first type or that user authentication is successfully completed, the processor 120 may be configured to change the camera security configuration to 'inactive'. The application corresponding to the first type may be provided with a configuration menu for changing the camera security configuration. In addition, the processor 120 may be configured to provide a configuration menu of the electronic device 101 for changing the camera security configuration. A user may request to change the camera security configuration through the configuration menu. When the camera security configuration is requested to be changed to 'active' while the camera security configuration is in a state of being 'inactive', in case that the identified application corresponds to the first type or that user authentication is successfully completed, the processor 120 may be configured to change the camera security configuration to 'active'.

The memory 130 may be divided into a secure area 570 and a normal area 580. The secure area 570 (trust zone) is an area having high security (or reliability) and may refer to a trusted execution environment (TEE). The normal area 580 (normal zone) is an area having lower security than the secure area 570, and may refer to a rich execution environment (REE). The secure area 570 may correspond to a separately hidden storage space. The secure area 570 may be a storage space physically or logically separated from the normal area 580. Security display data corresponding to the camera security configuration may be stored in the secure area 570. The security display data may include one or more camera security patterns. An application list corresponding to the first type or an application list corresponding to the second type may be stored in the normal area 580 or the secure area 570.

The display module 160 may visually provide information to the outside (e.g., a user) of the electronic device 101. The display module 160 may display the camera security pattern under the control of the processor 120. When the camera security configuration is active, the display module 160 may display the camera security pattern stored in the secure area 570 (e.g., a secure display control buffer) of the memory 130. When the camera security configuration is inactive, the display module 160 may display data stored in the normal area 580 (e.g., a normal display control buffer) of the memory 130.

The camera module 180 may capture a still image and/or a video. According to an embodiment, the camera module 180 may include one or more lenses, image sensors, image signal processors, or flashes.

Figure 6:
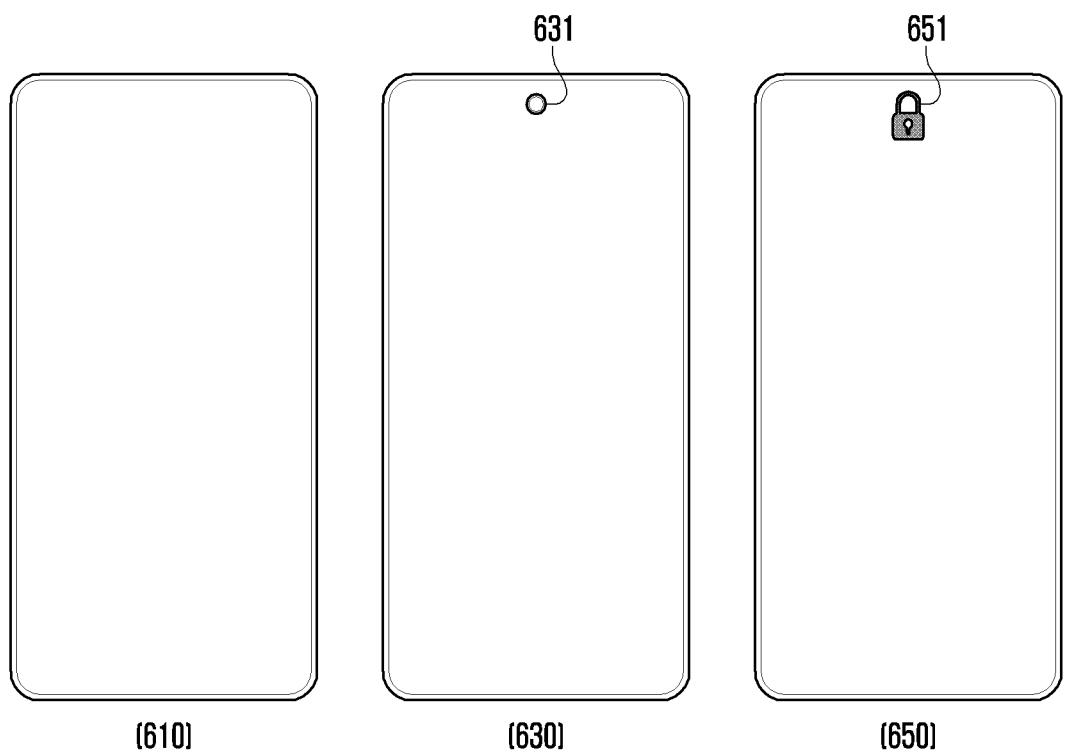
FIG. 6 illustrates an example of configuring camera security in an electronic device according to an embodiment of the disclosure.
Figure 6:
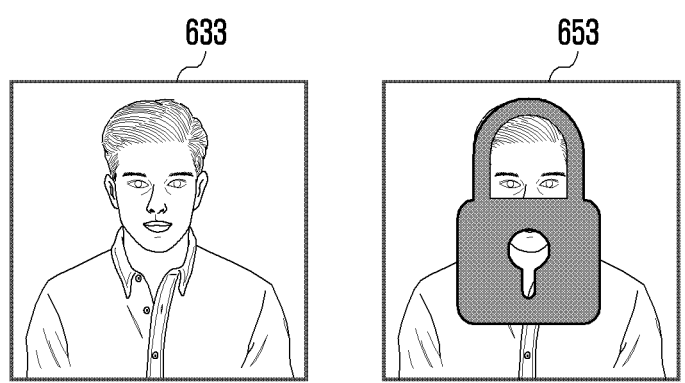

FIG. 6 illustrates an example of configuring camera security in an electronic device according to an embodiment of the disclosure.

Referring to FIG. 6, an electronic device (e.g., the electronic device 101 of FIG. 1) according to various embodiments may include a UDC camera (e.g., the camera module 180 of FIG. 1), and in case that a camera module 180 is not used, may display a first user interface 610. The UDC camera may be disposed below a display (e.g., the display module 160 of FIG. 1), and acquire an external light source through a hole (e.g., the opening 4321 of FIG. 4) formed in the display module 160. Since the description related to the UDC camera has been described in detail with reference to FIGS. 2A, 2B, 3, and 4, it may be briefly described here. The first user interface 610 may be used to display data (or an image) using pixels at a position where the camera module 180 is disposed. The electronic device 101 may display, on the display module 160, data having been stored in a normal area (e.g., the normal area 580 of FIG. 5) of a memory (e.g., the memory 130 of FIG. 1).

The electronic device 101 may display a second user interface 630 when the camera module 180 is used. The second user interface 630 may be configured to visually expose (or display) a position or a hole in which the camera module 180 is disposed. The electronic device 101 may visually expose, as shown in the second user interface 630, a position 631 in which the camera module 180 is disposed, so as to allow a user to recognize (or perceive) that the camera module 180 is being driven. When the camera security configuration is inactive and the camera module 180 is driven, the electronic device 101 may display the second user interface 630. The first image 633 may refer to an image acquired from the camera module 180 in a state in which the camera security configuration is inactive.

The electronic device 101 may display a third user interface 650 when the camera security configuration is active. The third user interface 650 may be used to display a camera security pattern 651 in response to the camera module 180. The camera security pattern 651 may be configured by at least one of text, an image (e.g., an icon), or a video. The electronic device 101 may display the third user interface 650 when an application corresponding to the second type (e.g., an unauthorized application) is executed or the camera security configuration is changed (or configured) to "active" by a user. The electronic device 101 may display the camera security pattern 651, having been stored in the secure area 570 of the memory 130, on the display module 160 corresponding to a position in which the camera module 180 is disposed. The electronic device 101 may display the camera security pattern 651 at a position in which the camera module 180 is disposed, thereby indicating that the electronic device 101 or the camera module 180 of the electronic device 101 is safely protected. When the camera security pattern is displayed, the user may recognize that a normal image cannot be acquired even if photographing is performed with a camera.

The second image 653 may refer to an image acquired from the camera module 180 in a state in which the camera security configuration is active. The second image 653 may be an image, which overlaps the camera security pattern 651 to be difficult to be identified. Even if the second image 653 was photographed by the camera module 180, the second image 653 may be invalidated because it is difficult for the photographed image to be identified due to the camera security pattern.

An electronic device (e.g., the electronic device 101 of FIG. 1) according to various embodiments may include a display (e.g., the display module 160 of FIG. 1), a camera module (e.g., the camera module 180 of FIG. 1) disposed below the display, a memory (e.g., the memory 130 of FIG. 1), and a processor (e.g., the processor 120 of FIG. 1) operatively connected to at least one of the display, the camera module, or the memory, wherein the processor may be configured to: receive a camera security configuration change; identify an application being executed; determine whether the identified application corresponds to a configured condition; and based on a result of the determination, control display of a camera security pattern in a display area (e.g., a second display area 830 of FIGS. 8A and 8B) of the display corresponding to the camera module.

The processor may be configured to receive the camera security configuration change from a user or an application.

The configured condition may correspond to a case in which the identified application corresponds to a first type of application or is an application for which user authentication is successfully completed. Further, the first type of application may be an authorized application.

The processor may be configured to change the camera security configuration when the identified application corresponds to a first type of application.

When the identified application corresponds to a second type of application, the processor may be configured not to permit the camera security configuration change, and the second type may be an unauthorized application.

When the identified application does not correspond to a first type and a second type of application, the processor may be configured to request user authentication, and when the user authentication is successfully completed, the processor may be configured to change the camera security configuration.

The memory may be configured to download, from a system server, an application list corresponding to the first type of application or an application list corresponding to the second type of application, and store the application lists.

When the camera security configuration is requested to be changed to 'inactive' while the camera security configuration is in a state of being 'active', the processor may be configured not to display the camera security pattern when the configured condition is satisfied.

When the camera security configuration is requested to be changed to 'active' while the camera security configuration is in a state of being 'inactive', the processor may be configured to display the camera security pattern when the configured condition is satisfied.

When the camera security configuration is requested to be changed to 'inactive' while the camera security configuration is in a state of being 'active', the processor may be configured to maintain display of the camera security pattern when the configured condition is not satisfied.

When the camera security configuration is requested to be changed to 'active' while the camera security configuration is in a state of being 'inactive', the processor may be configured not to display the camera security pattern when the configured condition is not satisfied.

Figure 7:
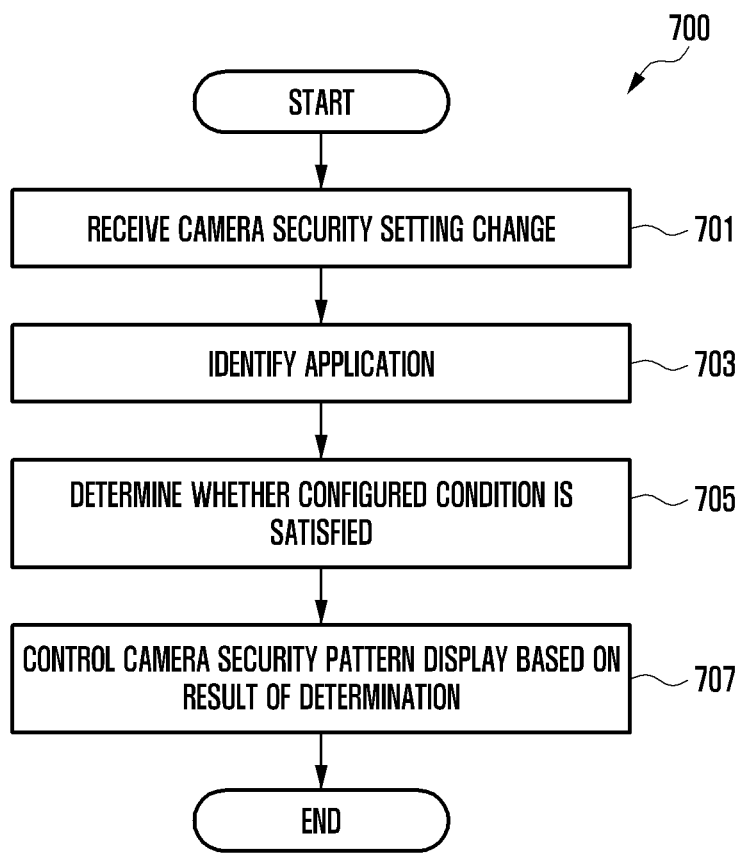
FIG. 7 is a flowchart illustrating a method for operating an electronic device according to an embodiment of the disclosure.

FIG. 7 is a flowchart 700 illustrating a method for operating an electronic device according to an embodiment of the disclosure.

Referring to FIG. 7, in operation 701, a processor (e.g., the processor 120 of FIG. 1) of an electronic device (e.g., the electronic device 101 of FIG. 1) according to various embodiments may receive a camera security configuration change. The electronic device 101 may include a UDC camera (e.g., the camera module 180 of FIG. 1). The camera security configuration may include displaying a camera security pattern in response to the camera module 180 (e.g., ON, 'active'), or not displaying a camera security pattern in response to the camera module 180 (e.g., OFF, 'inactive'). The camera security configuration change may be received from a user or an application. The camera security pattern may be configured by at least one of text, an image (e.g., an icon), or a video.

For example, when an application is executed, the application may request to change the camera security configuration. Alternatively, a user may change the camera security configuration regardless of application execution. The camera security configuration may be changed through a configuration menu or an application of the electronic device 101. For example, the user may change the camera security configuration through the configuration menu of the electronic device 101 on a home screen or, or may change, after executing an application, the camera security configuration through the configuration menu of the executed application. The camera security configuration change may be received from a display control framework. The display control framework may be included in a normal area (e.g., the normal area 560 of FIG. 5) of the processor 120.

In operation 703, the processor 120 may be configured to identify an application. When the camera security configuration change is received from the application, the processor 120 may be configured to identify an application (or the type of application) having requested the camera security configuration change. Alternatively, when the user executes an application and requests to change the camera security configuration, the processor 120 may be configured to identify an application being executed at a time point at which the camera security configuration change is received.

Operation 701 and operation 703 may be simultaneously performed regardless of sequence. In addition, the sequence of operations included in a flowchart 700 may be changed.

In operation 705, the processor 120 may be configured to determine whether a configuration condition is satisfied. The configured condition may correspond to a case in which the identified application corresponds to a first type of application or user authentication is successfully completed. The application may include one of the first type, a second type, and a third type of application. The first type of application may be an authorized application, the second type of application may be an unauthorized application, and the third type of application may be an application that does not correspond to the first type and the second type.

When the identified application corresponds to the first type of application, the processor 120 may allow the camera security configuration change. When the identified application corresponds to the second type of application, the processor 120 may be configured not to allow the camera security configuration change (e.g., disapproval). The processor 120 may be configured to request user authentication when the identified application corresponds to the third type of application, and allow the camera security configuration change when the user authentication is successfully completed. The processor 120 may disapprove the camera security configuration change when the user authentication fails.

According to various embodiments, in a normal area (e.g., the normal area 580 of FIG. 5) of a memory (e.g., the memory 130 of FIG. 1), an application list (e.g., an allowlist) corresponding to the first type or an application list (e.g., a blocklist) corresponding to the second type may be stored. The application list may be downloaded or updated in real time, periodically, or selectively from a system server (e.g., the server 108 of FIG. 1). When a new application is developed and sold to a store, the application may be unable to be divided (or classified) into the first type or the second type for a predetermined period of time. When the new application does not belong to the first type and the second type of application, the new application may activate or deactivate the camera security configuration through user authentication.

According to various embodiments, the server 108 may divide the new application into the first type or the second type based on a review (or report) of a user who has used the new application or an examination of the new application. The processor 120 may be configured to download an application list corresponding to the first type or an application list corresponding to the second type in real time, periodically, or according to the request of the server 108, and store the application list in a normal area 580 of the memory 130. After the new application is classified into one of the first type and the second type of application, when the new application corresponds to the first type of application, the processor 120 may be configured to allow the camera security configuration change to be possible. However, when the new application corresponds to the second type of application, the processor 120 may be configured to perform control (e.g., disapprove) to make the camera security configuration change impossible.

In operation 707, the processor 120 may be configured to control display of a camera security pattern based on a result of the determination. For example, when the camera security configuration is requested to be changed to 'inactive' while the camera security configuration is in a state of being 'active', the processor 120 may be configured not to display the camera security pattern when the configured condition is satisfied (e.g., the camera security configuration change is allowed). When an application corresponding to the first type (e.g., a camera application) is executed in a state in which the camera security configuration is in a state of being 'active', the processor 120 may be configured to automatically (e.g., by the request of a camera application) change the camera security configuration to the 'inactive' state, and when the execution of the application is terminated (e.g., photographing is terminated), automatically change again to the previous secure state (e.g., active state).

When the camera security pattern is not displayed, a user may visually recognize that camera photographing is allowed. When the camera security configuration is requested to be changed to 'active' while the camera security configuration is in a state of being 'inactive', the processor 120 may display the camera security pattern when the configured condition is satisfied. The camera security pattern may be displayed at a position where the camera module 180 is disposed, and may be an image (e.g., an icon). When the camera security pattern is displayed, a user may visually recognize that camera photographing is not allowed.

When the camera security configuration is requested to be changed to 'inactive' while the camera security configuration is in a state of being 'active', the processor 120 may maintain the display of the camera security pattern when the configured condition is not satisfied (e.g., disapproval of the camera security configuration change). When the camera security configuration is requested to be changed to 'active' while the camera security configuration is in a state of being 'inactive', the processor 120 may be configured not to display the camera security pattern when the configured condition is not satisfied. For example, since an application corresponding to the second type does not have an access right to perform secure configuration at a framework terminal, the application may be unable to change camera security configurations (e.g., active or inactive).

Figure 8A:
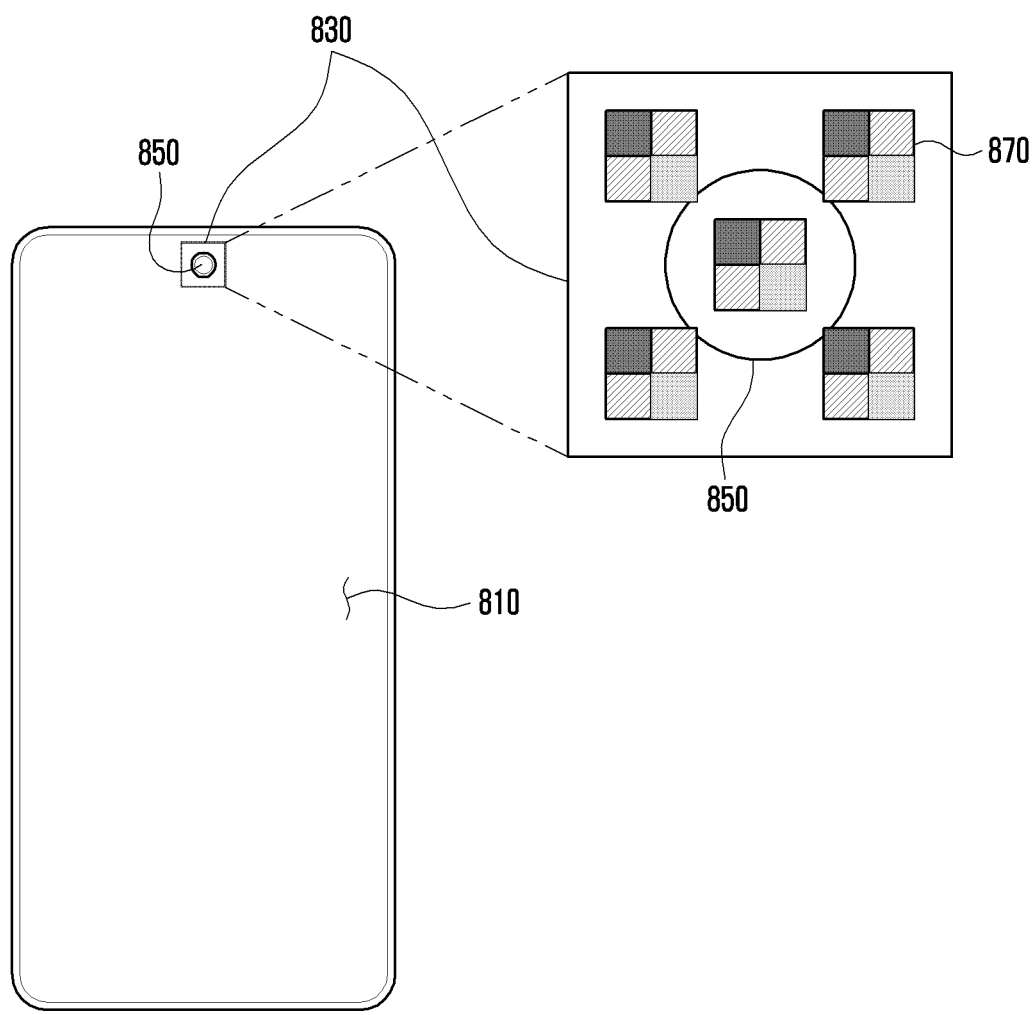
FIG. 8A illustrates an example of dividing a display area of an electronic device according to an embodiment of the disclosure.

FIG. 8A illustrates an example of dividing a display area of an electronic device according to an embodiment of the disclosure.

Referring to FIG. 8A, a display (e.g., the display module 160 of FIG. 1) of an electronic device (e.g., the electronic device 101 of FIG. 1) according to various embodiments may include a first display area 810. The first display area 810 may include the entire area of the display module 160. The first display area 810 may include a second display area 830 and a third display area 850. The second display area 830 may be an area for displaying a camera security pattern 870. The camera security pattern 870 may be configured by at least one of text, an image (e.g., an icon), or a video. The second display area 830 may include the third display area 850 and may be an area larger than the third display area 850. Although the second display area 830 is shown as a rectangle in the drawing, the second display area 830 may have various shapes such as a circle, a triangle, and a polygon. The third display area 850 may be an area corresponding to a UDC camera (e.g., the camera module 180 of FIG. 1) disposed below the display module 160. For example, the third display area 850 is an area in which the camera module 180 is disposed, and may correspond to an area in which an image sensor of the camera module 180 acquires an external light source.

Figure 8B:
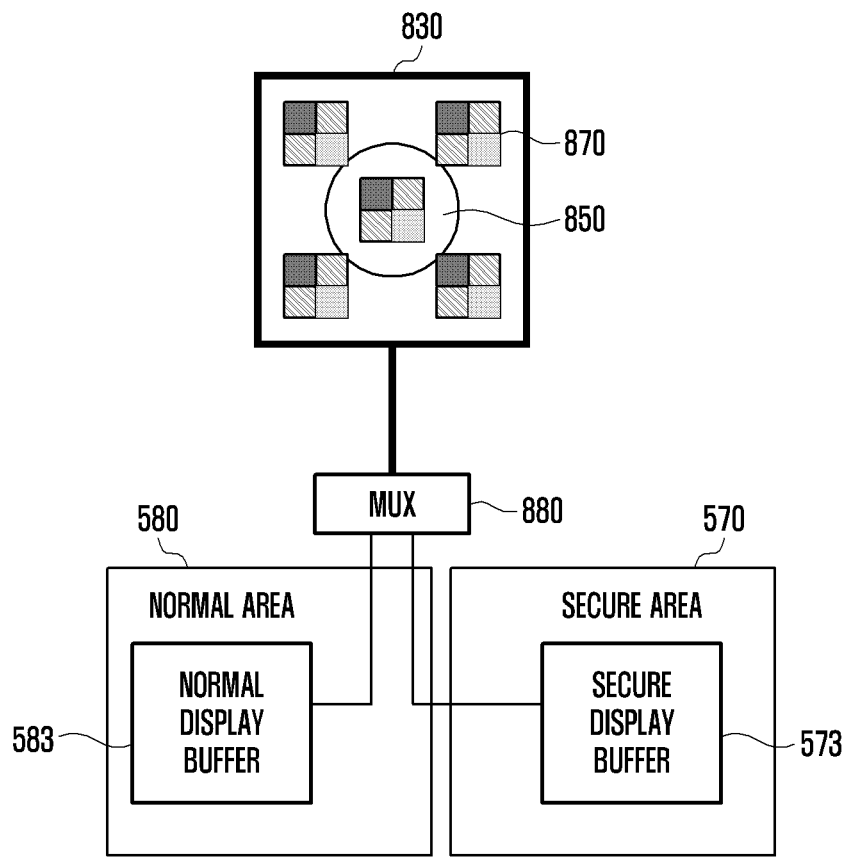
FIG. 8B illustrates an example of controlling a camera secure area of an electronic device according to an embodiment of the disclosure.

FIG. 8B illustrates an example of controlling a camera secure area of an electronic device according to an embodiment of the disclosure.

Referring to FIG. 8B, a memory (e.g., the memory 130 of FIG. 1) of the electronic device 101 may include a normal area (e.g., the normal area 580 of FIG. 5) and a secure area (e.g., the secure area 570 of FIG. 5). A processor (e.g., the processor 120 of FIG. 1) of the electronic device 101 may be configured to perform control such that when the camera security configuration is inactive, data having been stored in a normal display buffer 583 of a normal area 580 is displayed, and when the camera security configuration is active, data having been stored in a secure display buffer 573 of a secure area 570 is displayed. Alternatively, a display driving circuit DDI may control, on behalf of the processor 120, the display of data having been stored in the normal display buffer 583 of the normal area 580 or the secure display buffer 573 of the secure area 570. The processor 120 may be configured to control display of data having been stored in the normal display buffer 583 or the secure display buffer 573 by controlling a MUX 880.

For example, when the camera security configuration is active, the processor 120 (e.g., the secure area 550 of the processor 120 of FIG. 5) may be configured to control data, having been stored in the secure display buffer 573, to be displayed on the second display area 830. When the camera security configuration is active, the processor 120 may be configured to control the security display data, having been stored in the secure display buffer 573, to be displayed on the second display area 830 with priority over data having been stored in the normal display buffer 583, by controlling the mux 880. When the camera security configuration is inactive, the processor 120 (e.g., the normal area 560 of the processor 120 of FIG. 5) may be configured to control data, having been stored in the normal display buffer 583, to be displayed on the first display area 810, by controlling the mux 880. The processor 120 may be configured to display data having been stored in the secure display buffer 573 or the normal display buffer 583 on at least one of the first display area 810, the second display area 830, and the third display area 850.

A table 890 related to camera security configuration may be stored in the secure area 570. When the camera security configuration is active (e.g., ON), security display data may be stored in the table 890. The security display data may include one or more camera security patterns 870 (e.g., a first camera security pattern, a second camera security pattern, and a third camera security pattern). The camera security pattern 870 may be configured by at least one of text, an image (e.g., an icon), or a video. In addition, when the camera security configuration is inactive (e.g., OFF), the table 890 may be configured not to display the security display data. When the camera security configuration is active, the processor 120 may be configured to read the security display data (e.g., a value of the security display data) having been stored in the table 890 and write the same on the secure display buffer 573. The display module 160 may perform control to display on the second display area 830 by driving a display panel according to a value recorded in the secure display buffer 573 (e.g., a value of the security display data). The second display area 830 includes the third display area 850, but for example, the display module 160 may perform control to display on the second display area 830 and/or the third display area 850 by driving the display panel according to the value recorded in the secure display buffer 573 (e.g., the value of the security display data).

Figure 8C:
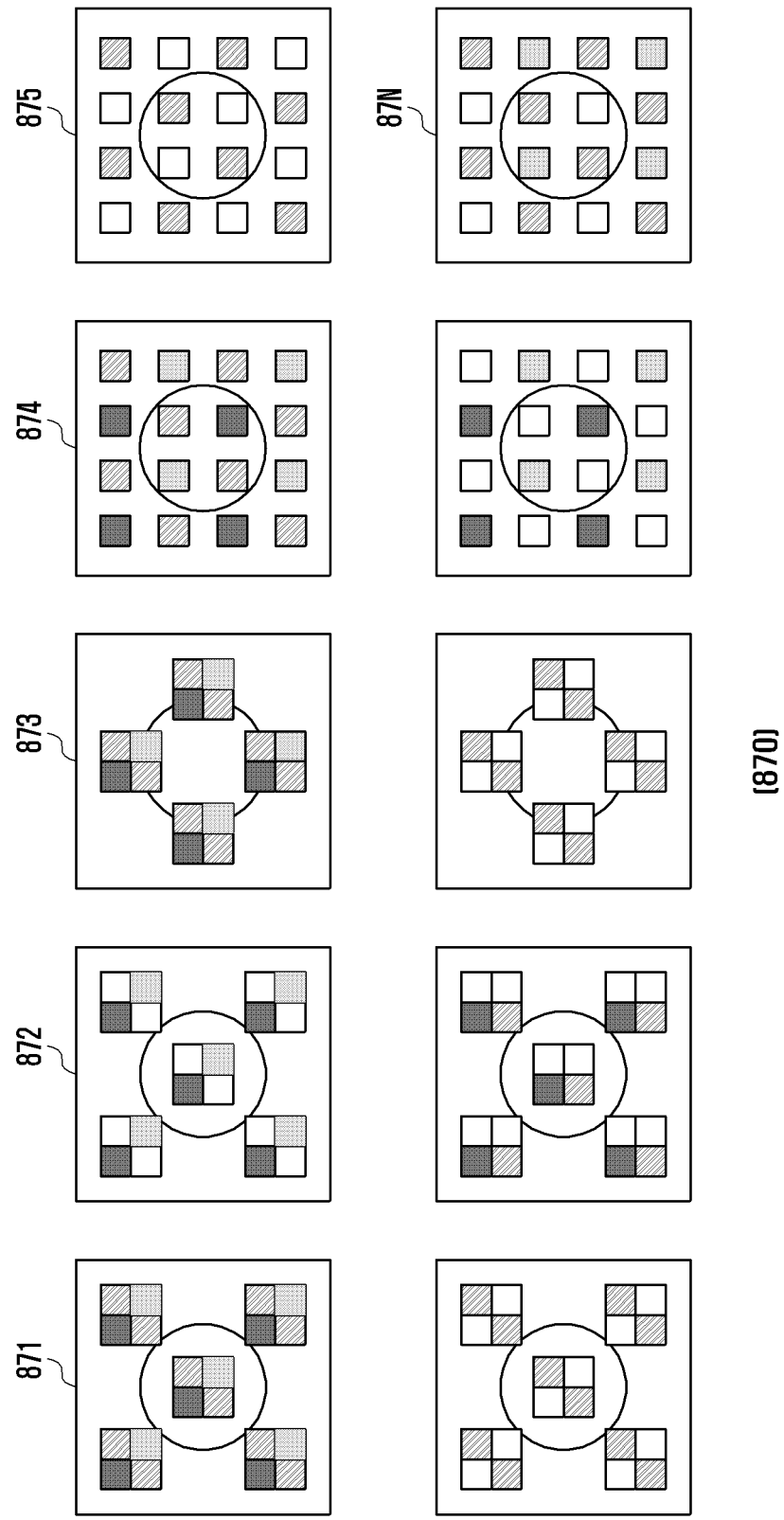
FIG. 8C illustrates various examples of a camera security pattern of an electronic device according to an embodiment of the disclosure.

FIG. 8C illustrates various examples of a camera security pattern of an electronic device according to an embodiment of the disclosure.

Referring to FIG. 8C, in a secure area 570, one or more camera security patterns 870 may be stored. The camera security pattern 870 may be configured by at least one of text, an image (e.g., an icon), or a video. For example, the camera security pattern 870 may include a first camera security pattern 871, a second camera security pattern 872, a third camera security pattern 873, a fourth camera security pattern 874, a fifth camera security pattern (875) . . . and a n-th camera security pattern 87*n*. The first camera security pattern 871 to the n-th camera security pattern 87*n* may have different patterns and include various types of patterns.

According to various embodiments, the processor 120 may be configured to change a camera security pattern displayed on the display module 160 according to time. The processor 120 may display the first camera security pattern 871 for a configured period of time (e.g., 30 seconds, one minute, or one hour), and may display the second camera security pattern 872 when the configured period of time elapses. After displaying the second camera security pattern 872 for a configured period of time, the processor 120 may display the third camera security pattern 873. Alternatively, the processor 120 may be configured to select one camera security pattern from among a plurality of camera security patterns based on a user input, and display the selected camera security pattern. The processor 120 may be configured to change a camera security pattern displayed according to time, or display any one camera security pattern without changing the camera security pattern. Whether to change the camera security pattern may differ according to a configuration of the electronic device 101 or a configuration by a user.

According to various embodiments, the processor 120 may be configured to generate a security pattern based on a user input. The processor 120 may be configured to provide a user interface (UI) for generating a security pattern, and store the security pattern in the secure area 570 based on a user input.

Figure 9:
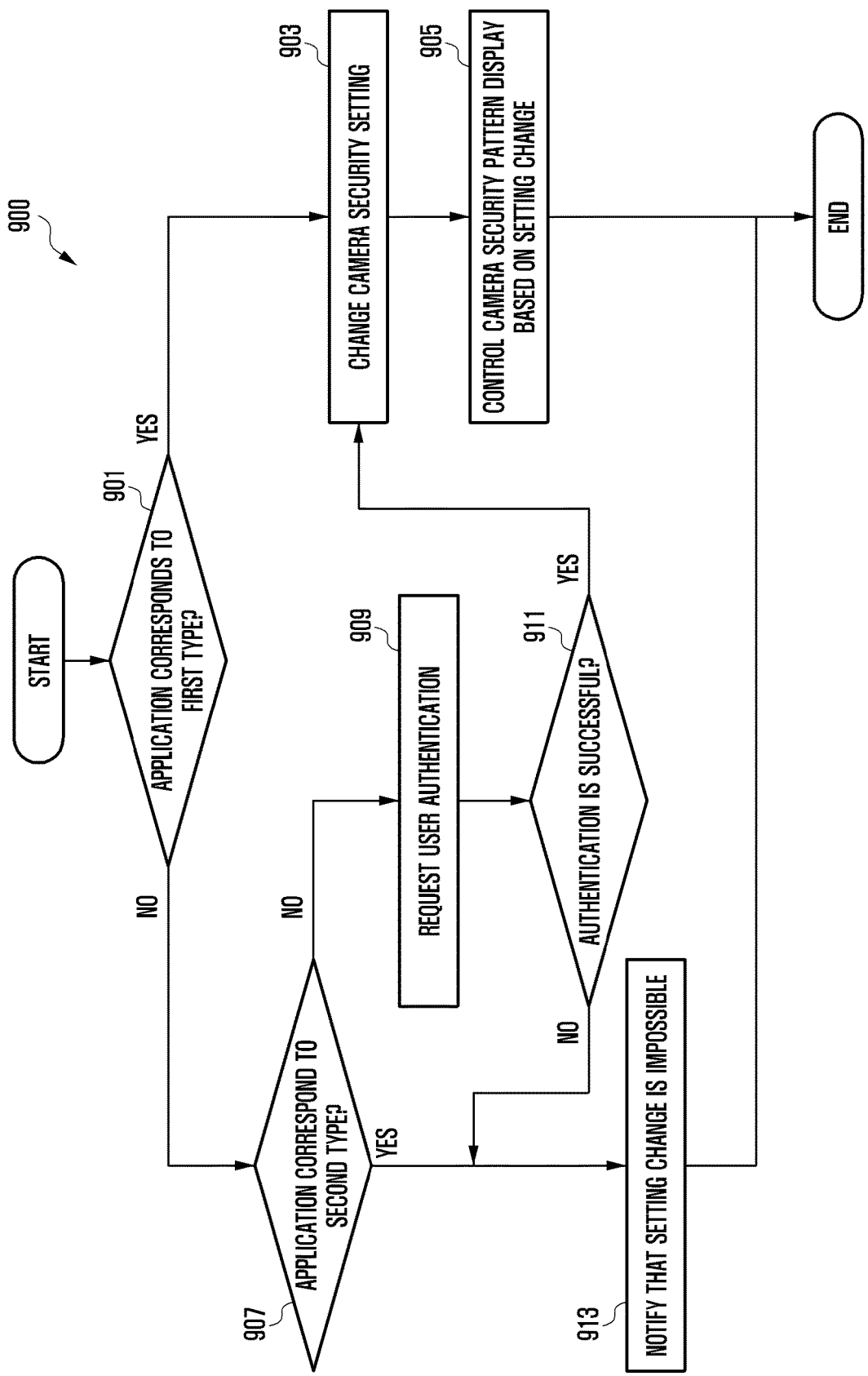
FIG. 9 is a flowchart illustrating a method for changing a camera security configuration in an electronic device according to an embodiment of the disclosure.

FIG. 9 is a flowchart 900 illustrating a method for changing a camera security configuration in an electronic device according to an embodiment of the disclosure. FIG. 9 is a detailed diagram of operation 705 and operation 707 of FIG. 7.

Referring to FIG. 9, in operation 901, a processor (e.g., the processor 120 of FIG. 1) of an electronic device (e.g., the electronic device 101 of FIG. 1) according to various embodiments may be configured to determine whether an application corresponds to a first type of application. The application may refer to an application being executed at a time point at which a camera security configuration change is received. The first type may refer to an authorized application. The authorized application is classified by a system server (e.g., the server 108 of FIG. 1) and may be unable to be changed by a user. For example, the authorized application may be an application (e.g., a camera application or face unlock) included at the time of manufacture (or releasing) of the electronic device 101. An application list corresponding to the first type may be downloaded from a server 108 and stored in a normal area (e.g., the normal area 580 of FIG. 1) of a memory (e.g., the memory 130 of FIG. 1).

When the application corresponds to the first type of application, the processor 120 may be configured to perform operation 903, and when the application is not the first type of application, the processor may be configured to perform operation 907.

When the application corresponds to the first type of application, the processor 120 may be configured to change a camera security configuration in operation 903. When the camera security configuration change is requested while the camera security configuration is in a state of being 'active', the processor 120 may be configured to change the camera security configuration to 'inactive'. Alternatively, when the camera security configuration change is requested while the camera security configuration is in a state of being 'inactive', the processor 120 may be configured to change the camera security configuration to 'active'.

In operation 905, the processor 120 may be configured to control display of a camera security pattern based on the configuration change. The camera security pattern may be configured by at least one of text, an image (e.g., an icon), or a video. For example, when the camera security configuration is changed to 'inactive', the processor 120 may be configured not to display the camera security pattern. When the camera security configuration is changed to 'active', the processor 120 may display the camera security pattern. The processor 120 may display the camera security pattern on a display (e.g., the display module 160 of FIG. 1) corresponding to a UDC camera (e.g., the camera module 180 of FIG. 1). For example, the processor 120 may be configured to display the camera security pattern on a second display area (e.g., the second display area 830 of FIGS. 8A to 8C) including an area in which the camera module 180 is disposed (e.g., the third display area 850 of FIGS. 8A to 8C).

According to various embodiments, the processor 120 may be configured to change a camera security pattern displayed according to time or display any one camera security pattern without changing the camera security pattern. Whether to change the camera security pattern may differ according to a configuration of the electronic device 101 or a configuration by a user.

When the application is not the first type of application, the processor 120 may be configured to determine whether the application corresponds to a second type of application in operation 907. The second type of application may refer to an unauthorized application. The server 108 may classify the unauthorized application and a user may be unable to change the application. For example, the unauthorized application may be an application installed on the electronic device 101 by a user or installed on the electronic device without the user's knowledge. An application list corresponding to the second type may be downloaded from the server 108 and stored in a normal area 580 of the memory 130.

When the application corresponds to the second type of application, the processor 120 may be configured to perform operation 913, and when the application is not the second type of application, perform operation 909.

When the application corresponds to the second type of application, the processor 120 may be configured to notify that the camera security configuration change is not possible in operation 913. With regard to the application corresponding to the second type of application, a normal image may be difficult to be acquired because a camera security pattern is photographed in an overlapped manner during photographing through a camera. When an application randomly attempts a camera photographing without permission (authorization) from a user of the electronic device 101, the processor 120 may perform control to display a camera security pattern so as not to acquire a normal image. For example, the application corresponding to the second type may request a change of a camera security configuration to 'inactive' while the camera security configuration is in a state of being 'active'. The processor 120 may be configured to maintain a state in which the camera security configuration is 'active'.

The processor 120 may display a camera security pattern when a camera security configuration is 'active'. Although a camera operation request is received from an application, the processor 120 may be configured to provide a user interface informing that the camera photographing is being protected by displaying a camera security pattern. The user interface may be displayed in the form of a pop-up or banner. The user interface may be configured by at least one of text, an image, a voice, and a video.

When the application is not the second type of application, the processor 120 may be configured to request user authentication in operation 909. When the application corresponds to neither the first type nor the second type of application, the processor 120 may be configured to selectively change a camera security configuration through user authentication. The user authentication may include a password, a pattern, or biometric recognition (e.g., a fingerprint or iris). The processor 120 may be configured to provide a user interface for user authentication (e.g., a keypad for inputting a password, a location guide for recognizing a fingerprint, etc.).

In operation 911, the processor 120 may be configured to determine whether the user authentication is successful. The processor 120 may be configured to acquire authentication information (e.g., a password, a pattern, or biometric information) through the user interface for user authentication. The processor 120 may be configured to perform user authentication by comparing authentication information stored in the memory 130 with the acquired authentication information. When the authentication information stored in the memory 130 is the same as the acquired authentication information, the processor 120 may be configured to determine that user authentication is successful. When the authentication information stored in the memory 130 and the acquired authentication information are not the same, the processor 120 may be configured to determine that user authentication has failed.

The processor 120 may, when the user authentication is successful, perform operation 903, and when the user authentication has failed, perform operation 913. The processor 120 may, when the user authentication is successful, perform operation 903 and operation 905 so as to change a camera security configuration, and control display of a camera security pattern based on the configuration change. The processor 120 may, when the user authentication has failed, perform operation 913 so as to notify that a camera security configuration change is not possible. Alternatively, the processor 120 may, when the user authentication has failed, request user authentication again.

Figure 10:
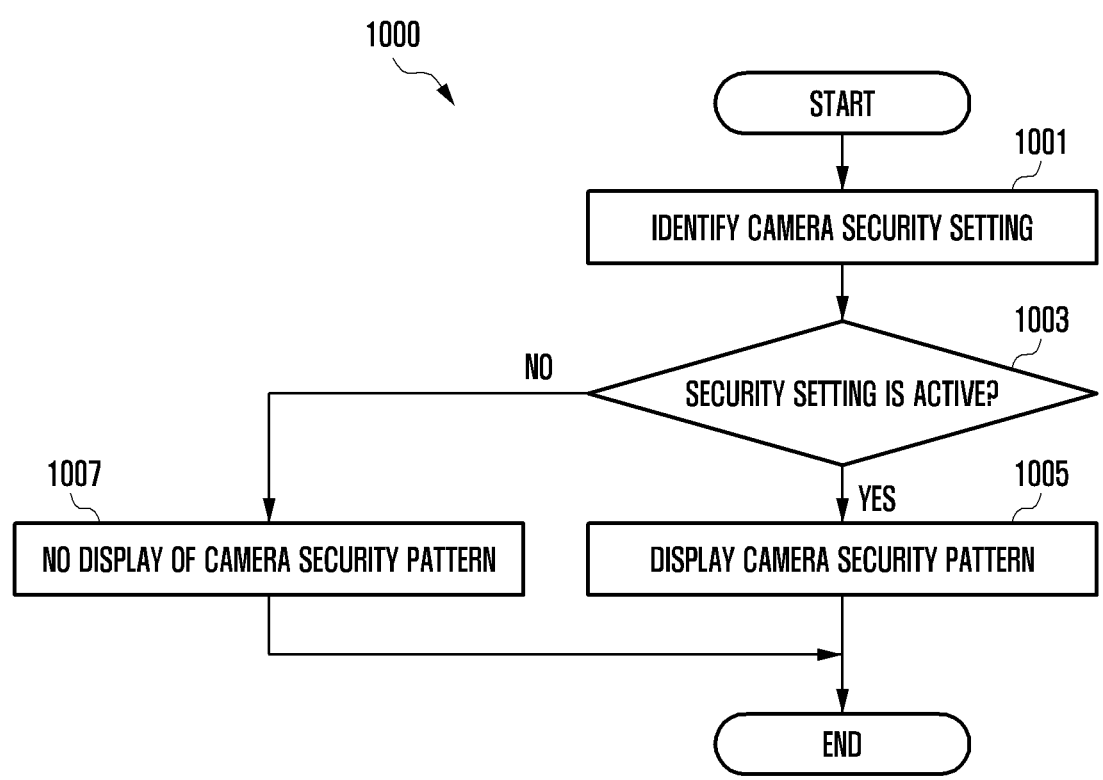
FIG. 10 is a flowchart illustrating a method for displaying a camera security pattern in an electronic device according to an embodiment of the disclosure.

FIG. 10 is a flowchart 1000 illustrating a method of displaying a camera security pattern in an electronic device according to an embodiment of the disclosure. FIG. 10 is a detailed diagram of operation 905 of FIG. 9.

Referring to FIG. 10, in operation 1001, a processor (e.g., the processor 120 of FIG. 1) of an electronic device (e.g., the electronic device 101 of FIG. 1) according to various embodiments may identify a camera security configuration. The operation of identifying a camera security configuration may include an operation of changing the camera security configuration.

In operation 1003, the processor 120 may be configured to determine whether the camera security configuration is active. When the camera security configuration is active, the processor 120 may be configured to perform operation 1005, and when the camera security configuration is inactive, perform operation 1007.

When the camera security configuration is active, the processor 120 may display a camera security pattern in operation 1005. The camera security pattern may be configured by at least one of text, an image (e.g., an icon), or a video. The processor 120 may be configured to perform control such that a camera security pattern having been stored in the secure display buffer 573 included in a secure area (e.g., the secure area 570 in FIG. 5) of a memory (e.g., the memory 130 in FIG. 1) is displayed on a display (e.g., the display module 160 of FIG. 1). For example, the processor 120 may display a camera security pattern, having been stored in the secure display buffer 573, on a second display area (e.g., the second display area 830 of FIGS. 8A to 8B). The second display area 830 is an area corresponding to a UDC camera (e.g., the camera module 180 of FIG. 1), and may be an area slightly larger than an area where an image sensor of the camera module 180 is displayed.

According to various embodiments, the processor 120 may be configured to change a camera security pattern displayed according to time or display any one camera security pattern without changing the camera security pattern. Whether to change the camera security pattern may differ according to a configuration of the electronic device 101 or a configuration by a user.

When the camera security configuration is inactive, the processor 120 may be configured to perform control not to display the camera security pattern in operation 1007. The processor 120 may display data, having been stored in the normal display buffer 583 of the memory 130, on the display module 160. When the camera security configuration is inactive, the processor 120 may be configured to display the data, having been stored in the normal display buffer 583, on the entire area of the display module 160 (e.g., the first display area 810 of FIG. 8A) without displaying the camera security pattern.

Figure 11:
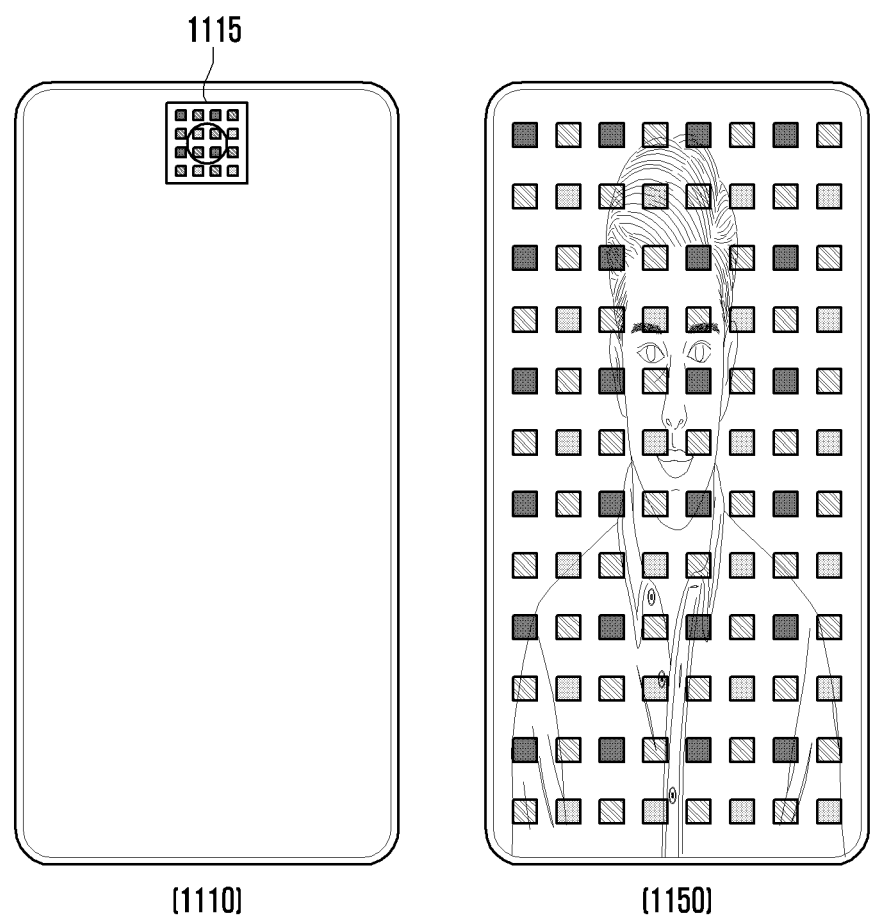
FIG. 11 illustrates an example of photographing performed while a camera security pattern is applied thereto by an electronic device according to an embodiment of the disclosure.

FIG. 11 illustrates an example of photographing performed while a camera security pattern is applied thereto by an electronic device according to an embodiment of the disclosure.

Referring to FIG. 11, an electronic device (e.g., the electronic device 101 of FIG. 1) according to various embodiments may display a first user interface 1110 when a camera security configuration is 'active'. The first user interface 1110 may include a camera security pattern 1115 displayed thereon, and may be a home screen or an execution screen of an application. The camera security pattern 1115 may be configured by at least one of text, an image (e.g., an icon), or a video. When photographing is performed using a UDC camera (e.g., the camera module 180 of FIG. 1) in a state in which the camera security configuration is 'active', the electronic device 101 may display a second user interface 1150. The second user interface 1150 may include a stored image or a preview image in which the camera security pattern 1115 is overlapped on a user's face. When photographing is performed by a camera while the camera security pattern 1115 is displayed, since the photographed image is difficult to be identified due to the displayed camera security pattern, the photographed image may be invalidated.

Figure 12:
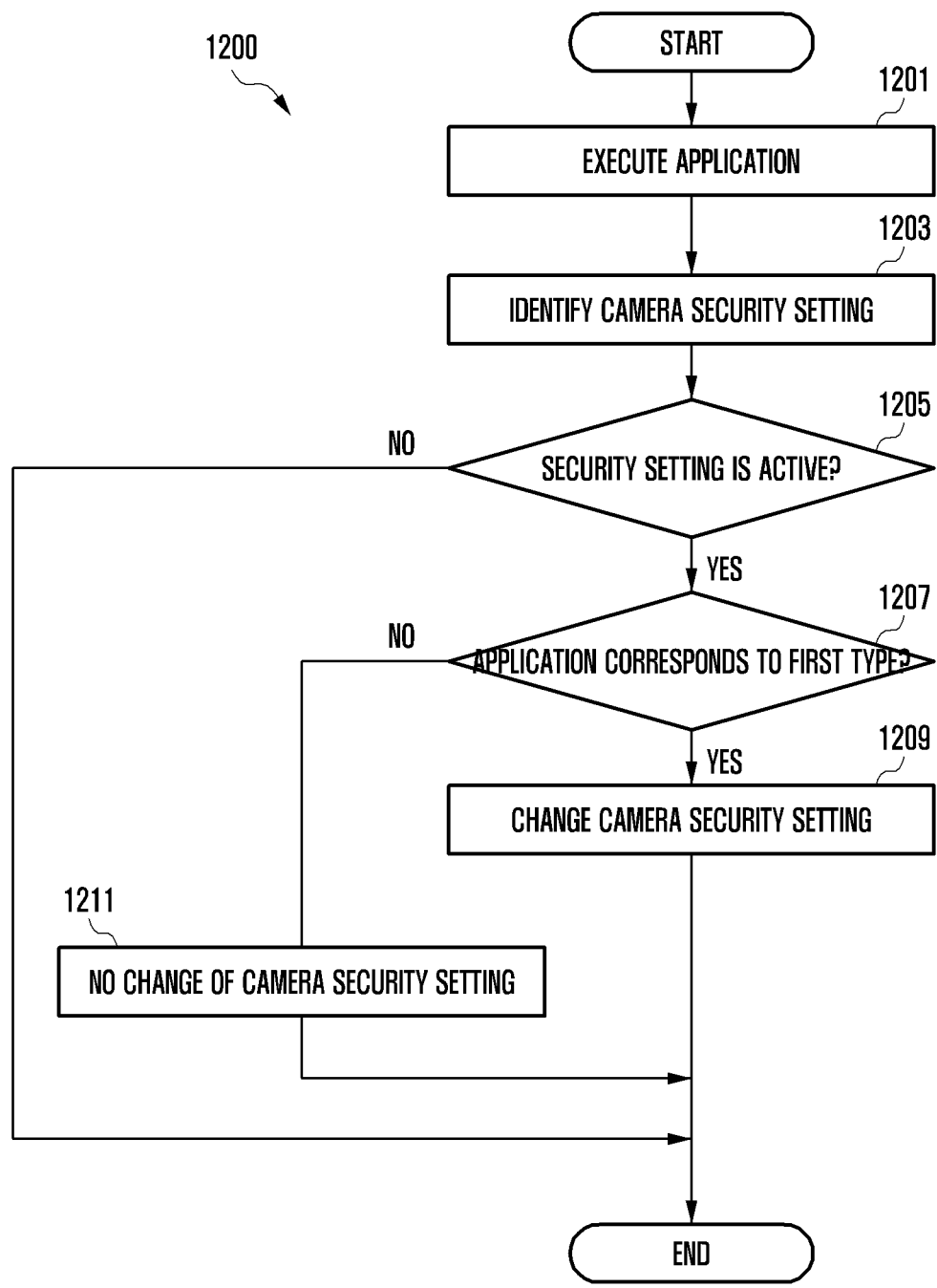
FIG. 12 is a flowchart illustrating a method for changing a camera security configuration in an electronic device according to an embodiment of the disclosure.

FIG. 12 is a flowchart 1200 illustrating a method of changing a camera security configuration in an electronic device according to an embodiment of the disclosure.

Referring to FIG. 12, in operation 1201, a processor (e.g., the processor 120 of FIG. 1) of an electronic device (e.g., the electronic device 101 of FIG. 1) according to various embodiments may execute an application. When an application icon is selected by a user on a home screen, the processor 120 may be configured to execute an application corresponding to the selected icon. Alternatively, when any one application is selected from a list recently executed, the processor 120 may be configured to execute the selected application.

In operation 1203, the processor 120 may be configured to identify a camera security configuration. The camera security configuration may be stored in a secure area (e.g., the secure area 570 of FIG. 5) of a memory (e.g., the memory 130 of FIG. 1). The processor 120 may be configured to identify the camera security configuration, having been stored in the secure area 570, in response to the execution of the application.

In operation 1205, the processor 120 may be configured to determine whether the camera security configuration is active. When the camera security configuration is active (ON), the processor 120 may be configured to perform operation 1207, and when the camera security configuration is inactive (OFF), the processor may end operations. When the camera security configuration is inactive, the processor 120 may be configured to change the camera security configuration to 'active' only in case that a request for the camera security configuration change is received from a user and a user authentication is successfully completed.

When the camera security configuration is active, the processor 120 may be configured to determine whether the executed application corresponds to the first type in operation 1207. The application may be included in one of the first type, the second type, and the third type of application. The first type may be an authorized application, the second type may be an unauthorized application, and the third type may be an application that does not correspond to the first type and the second type.

When the executed application corresponds to the first type of application, the processor 120 may be configured to perform operation 1209, and when the executed application does not correspond to the first type of application, perform operation 1211.

When the executed application corresponds to the first type of application, the processor 120 may be configured to change the camera security configuration in operation 1209. When an application corresponding to the first type is executed while the camera security configuration is in a state of being 'active', the processor 120 may be configured to change the camera security configuration to 'inactive'. When the application corresponding to the first type is executed, the processor 120 may be configured to change the camera security configuration. Alternatively, the processor 120 may be configured to receive a request for the camera security configuration change from the application corresponding to the first type of application, and change the camera security configuration. The processor 120 may be configured to display a camera security pattern in operation 1201 to operation 1207 in which the camera security configuration is in a state of being 'active', and not display the camera security pattern after changing the camera security configuration in operation 1209. The camera security pattern may be configured by at least one of text, an image (e.g., an icon), or a video.

When the executed application does not correspond to the first type of application, the processor 120 may be configured not to change the camera security configuration in operation 1211. When an application that does not correspond to the first type is executed while the camera security configuration is in a state of being 'active', the processor 120 may be configured not to change the camera security configuration. When the application that does not correspond to the first type is executed while the camera security configuration is in a state of being 'active', the processor 120 may be configured to maintain display of the camera security pattern in response to a UDC camera (e.g., the camera module 180 of FIG. 1). The processor 120 may be configured to display the camera security pattern on a second display area (e.g., the second display area 830 of FIGS. 8A and 8B) of a display (e.g., the display module 160 of FIG. 1).

According to various embodiments, in case that the camera security configuration is active, the processor 120 may be configured to maintain the camera security configuration to be 'active' without changing the camera security configuration when the executed application corresponds to the second type of application. The processor 120 may be unable to allow the camera security configuration change when the application corresponds to the second type.

According to various embodiments, in case that the camera security configuration is active, when the executed application corresponds to neither the first type nor the second type and a request for the camera security configuration change is received from a user, the processor 120 may be configured to change the camera security configuration to 'inactive' only in case that user authentication is successfully completed.

A method for operating an electronic device (e.g., the electronic device 101 of FIG. 1) according to various embodiments of the disclosure may include receiving a camera security configuration change from a user or an application, identifying an application being executed, determining whether the identified application corresponds to a configured condition, and based on a result of the determination, controlling to display a camera security pattern on a display area (e.g., the second display area 830 of FIGS. 8A and 8B) of a display (e.g., the display module 160 of FIG. 1) of the electronic device corresponding to a camera module (e.g., the camera module 180 of FIG. 1) of the electronic device.

The configured condition may correspond to a case in which the identified application corresponds to a first type of application or is an application for which user authentication is completed, and the first type of application is an authorized application.

The controlling may include changing the camera security configuration when the identified application corresponds to the first type of application.

The controlling may include not permitting the camera security configuration change when the identified application corresponds to a second type of application, and the second type is an unauthorized application.

The controlling may include: requesting user authentication when the identified application does not correspond to the first type or to the second type of application; and changing the camera security configuration when the user authentication has been successfully completed.

When the camera security configuration is requested to be changed to 'inactive' while the camera security configuration is in a state of being 'active', the controlling may include performing control not displaying the camera security pattern when the configured condition is satisfied.

When the camera security configuration is requested to be changed to 'active' while the camera security configuration is in a state of being 'inactive', the controlling may include performing control to display the camera security pattern when the configured condition is satisfied.

When the camera security configuration is requested to be changed to 'inactive' while the camera security configuration is in a state of being 'active', the controlling may include performing control to maintain the display of the camera security pattern when the configured condition is not satisfied.

When the camera security configuration is requested to be changed to 'active' while the camera security configuration is in a state of being 'inactive', the controlling may include performing control not to display the camera security pattern when the configured condition is not satisfied.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a camera module disposed below the display;
   memory storing one or more computer programs; and
   one or more processors operatively connected to at least one of the display, the camera module, or the memory,
   wherein the one or more computer programs include computer-executable instructions that, when executed by the one or more processors individually or collectively, cause the electronic device to:
   execute an application,
   identify whether the executed application is an unauthorized application with respect to using the camera module,
   and
   display a camera security pattern on a display area of the display based on identifying that the executed application is the unauthorized application,
   wherein an image captured by the camera module while displaying the camera security pattern on the display area is invalidated by the camera security pattern.

2. The electronic device of claim 1, wherein the one or more computer programs further include computer-executable instructions that, when executed by the one or more processors individually or collectively, cause the electronic device to receive a request for changing a camera security from a user or the executed application.

3. The electronic device of claim 2,
   wherein a predetermined condition corresponds to a case in which the executed application corresponds to a first type of application or is an application for which user authentication is completed, and
   wherein the first type of application is an authorized application.

4. The electronic device of claim 3, wherein the one or more computer programs further include computer-executable instructions that, when executed by the one or more processors individually or collectively, cause the electronic device to, in case that the executed application corresponds to the first type of application, change a camera security.

5. The electronic device of claim 3,
   wherein the one or more computer programs further include computer-executable instructions that, when executed by the one or more processors individually or collectively, cause the electronic device to, in case that the executed application corresponds to a second type of application, not permit to a request for changing a camera security, and
   wherein the second type of application is the unauthorized application.

6. The electronic device of claim 3, wherein the one or more computer programs further include computer-executable instructions that, when executed by the one or more processors individually or collectively, cause the electronic device to:

request user authentication in case that the executed application does not correspond to the first type of application; and change a camera security in case that the user authentication has been successfully completed.

7. The electronic device of claim 1, wherein the memory is configured to download, from a system server, an application list corresponding to a first type of application or an application list corresponding to a second type of application, and store the downloaded application list.

8. The electronic device of claim 3, wherein the one or more computer programs further include computer-executable instructions that, when executed by the one or more processors individually or collectively, cause the electronic device to, in case that a camera security is requested to be changed to 'inactive' while the camera security is in a state of being 'active,' not to display the camera security pattern in case that the predetermined condition is satisfied.

9. The electronic device of claim 3, wherein the one or more computer programs further include computer-executable instructions that, when executed by the one or more processors individually or collectively, cause the electronic device to, in case that a camera security is requested to be changed to 'active' while the camera security is in a state of being 'inactive,' display the camera security pattern in case that the predetermined condition is satisfied.

10. The electronic device of claim 3, wherein the one or more computer programs further include computer-executable instructions that, when executed by the one or more processors individually or collectively, cause the electronic device to, in case that a camera security is requested to be changed to 'inactive' while the camera security is in a state of being 'active,' maintain the display of the camera security pattern in case that the predetermined condition is not satisfied.

11. The electronic device of claim 3, wherein the one or more computer programs further include computer-executable instructions that, when executed by the one or more processors individually or collectively, cause the electronic device to, in case that a camera security is requested to be changed to 'active' while the camera security is in a state of being 'inactive,' not display the camera security pattern in case that the predetermined condition is not satisfied.

12. A method for operating an electronic device comprising a camera module disposed below a display, the method comprising:

executing an application;

identifying whether the executed application is an unauthorized application with respect to using the camera module; and displaying a camera security pattern on a display area of the display of the electronic device based on identifying that the executed application is the unauthorized application, wherein an image captured by the camera module while displaying the camera security pattern on the display area is invalidated by the camera security pattern.

13. The method of claim 12, wherein a predetermined condition corresponds to a case in which the executed application corresponds to a first type of application or is an application for which user authentication is completed, and wherein the first type of application is an authorized application.

14. The method of claim 13, wherein the displaying the camera security pattern on the display area comprises changing a camera security in case that the executed application corresponds to the first type of application.

15. The method of claim 13, wherein the displaying the camera security pattern on the display area comprises not permitting to change a camera security in case that the executed application corresponds to a second type of application, and wherein the second type of application is an unauthorized application.

16. The method of claim 13, wherein the displaying the camera security pattern on the display area comprises:

requesting user authentication in case that the executed application does not correspond to the first type of application; and changing a camera security in case that the user authentication has been successfully completed.

17. The method of claim 13, wherein in case that a camera security is requested to be changed to 'inactive' while the camera security is in a state of being 'active,'; the displaying the camera security pattern on the display area comprises not displaying the camera security pattern in case that the predetermined condition is satisfied.

18. The method of claim 13, wherein in case that a camera security is requested to be changed to 'active' while the camera security is in a state of being 'inactive,', the displaying camera security pattern on the display area comprises performing control to display a camera security pattern in case that the predetermined condition is satisfied.

19. The method of claim 13, wherein in case that a camera security is requested to be changed to 'inactive' while the camera security is in a state of being 'active,', the displaying the camera security pattern on the display area comprises performing control to maintain the display of the camera security pattern in case that the predetermined condition is not satisfied.

20. The method of claim 13, wherein in case that a camera security is requested to be changed to 'active' while the camera security is in a state of being 'inactive,' the displaying the camera security pattern on the display area comprises performing control not to display the camera security pattern in case that the predetermined condition is not satisfied.

* * * * *